United States Patent [19]

Viniczay et al.

[11] 3,864,040
[45] Feb. 4, 1975

[54] PHASE ANGLE MEASURING ARRANGEMENT

[75] Inventors: Gabriella Fuchs Viniczay, Steinach; Wilhelm Hutter, Roggwil/TG; Rudolf-Karl Böhme, Goldach, all of Switzerland

[73] Assignee: Aktiengesellshaft Adolf Saurer, Arbon, Switzerland

[22] Filed: Oct. 29, 1973

[21] Appl. No.: 410,369

[30] Foreign Application Priority Data
Oct. 27, 1972 Switzerland.................. 15711/72

[52] U.S. Cl................... 356/24, 317/6, 318/640, 324/91, 356/152, 356/139
[51] Int. Cl............................................. G01r 25/00
[58] Field of Search........... 324/83 R, 83 A, 83 FE, 324/88, 16 T, 91, 87, 161; 340/268; 318/577, 640; 317/6; 356/139, 152, 23, 24

[56] References Cited
UNITED STATES PATENTS
2,166,833  7/1939  Wilfart.............................. 324/91 X
2,281,954  5/1942  Rinia............................... 390/268 UX OTHER PUBLICATIONS
Korn et al.; Elec. Engr.; v. 69, n. 9; Sept. 1950. pp. 814–816.

Primary Examiner—Alfred E. Smith
Attorney, Agent, or Firm—Michael S. Striker

[57] ABSTRACT

A synchronizing signal generator is remotely controlled by a rotating shaft. A reference signal generator is directly coupled to the rotating shaft and furnishes a reference signal when the shaft is in a predetermined angular position. A glow lamp is energized in response to the reference signals and the synchronizing signals. The resulting beams from the lamp are reflected by a mirror rotating substantially in synchronism with the shaft onto a stationary disk. The angle between the two stationary light points which are created by the resulting strobescopic effect constitutes the angle between the reference signal and the synchronizing signal. A calibrated disk mounted angularly with respect to the stationary projection disk and rotatable by hand is coupled to the synchronizing signal generator through a flexible shaft or synchro so that the angle of generation of the synchronizing signal varies in accordance with the angular rotation of the calibrated disk. A second lamp indicates coincidence between reference signal and synchronizing signal.

5 Claims, 2 Drawing Figures

PHASE ANGLE MEASURING ARRANGEMENT

BACKGROUND OF THE INVENTION

This invention relates to a phase angle measuring arrangement for a machine having a rotating shaft. In particular it refers to an arrangement for measuring the phase angle between a synchronizing signal furnishing means operating under control of the shaft and a predetermined reference angle of the shaft. A first optical indicating element is furnished in such systems which indicates the angular position of the shaft at the time of generation of the synchronizing signal and a second optical indicator element is provided which furnishes an optical indication when the shaft passes the reference angle position. Measurement of the difference in angle between the generation of the synchronizing signal and the reference signal is of course important in automatic control systems and for monitoring the correct operation of various machines. It is also often desirable that the angle at which the synchronizing signal is generated be adjustable to coincide with the angle at which the reference signal is generated.

Systems are known in which an angular scale is affixed to the shaft of the machine and the scale is illuminated with a stroboscopic lamp synchronized to a periodic operating process. The reference angle of the shaft is indicated by an indicator or a mark, while the light spot of the stroboscopic lamp, which of course seems to stand still, serves as an indication of the relative angular position of a reference point in the operating process. This arrangement has the disadvantage that the angular indication is physically available only in the vicinity of the shaft. In larger machines wherein it may be desired to adjust the timing of the synchronizing signal, that is the timing of the reference points within the operating process in dependence on the angular difference observed by stroboscopic effect, great difficulties may result from the fact that this angular indication is either not available at the place where the adjustment may be made or is available only by use of a great deal of additional equipment.

SUMMARY OF THE INVENTION

It is the object of the present invention to furnish an at least somewhat mobile indicator arrangement for indicating the difference in phase angle between a reference position of a shaft of a machine and a predetermined point in an operating cycle.

It is a further object of the present invention to furnish an indicator system wherein an improvement of the optical phase angle indication is combined with greater ease of servicing and an exact unequivocal indication when coincidence between the synchronizing signal and the reference signal is obtained.

The present invention resides in equipment having a shaft, synchronizing signal furnishing means for furnishing synchronizing signals under control of said shaft, and reference signal furnishing means directly coupled to said shaft for furnishing reference signals when said shaft is in a predetermined angular position. The arrangement of the present invention is adapted to measure the phase angle between said synchronizing signals and said reference signals and comprises stationary projection disk means. It further comprises transducing means for converting said reference signals and said synchronizing signals into, respectively, first and second light beams; it further comprises projection means rotating substantially in synchronism with said shaft for projecting said first and second light beams onto said stationary projection disk means in such a manner that a first and second light spot is created on said projection disk means in response to said first and second light beams respectively. In a preferred embodiment of the present invention manually rotatable additional disk means are mounted annularly with respect to said stationary projection disk means. The additional disk means have an angular scale. Further, first coupling means are provided for coupling said additional disk means to said synchronizing signal furnishing means in such a manner that rotation of said additional disk means produces a corresponding rotation of said synchronizing signal furnishing means. Said additional disk means can thus be moved manually until such time as the light spot created by the reference signal is coincident with the light spot created by the synchronizing signals.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
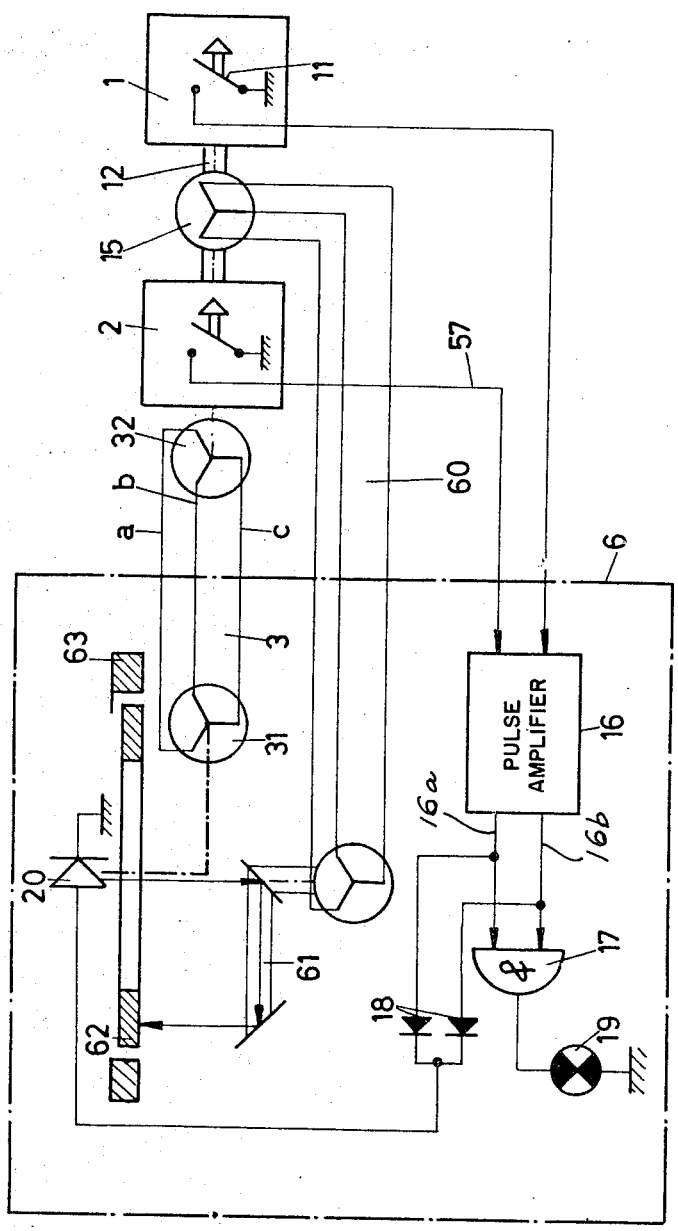
FIG. 1 shows a block diagram of a preferred embodiment of the present invention.

A preferred embodiment of the present invention will now be described with reference to the drawing.

Block 1 in FIG. 1 indicates a machine in which periodic processes take place. A shaft 12 extends from the machine. The angle of rotation of shaft 12 is to be indicated by synchronizing signal furnishing means 2, which may be a contactless signal furnishing means or, alternatively, a follow-up contact as shown in block 2.

Figure 2:
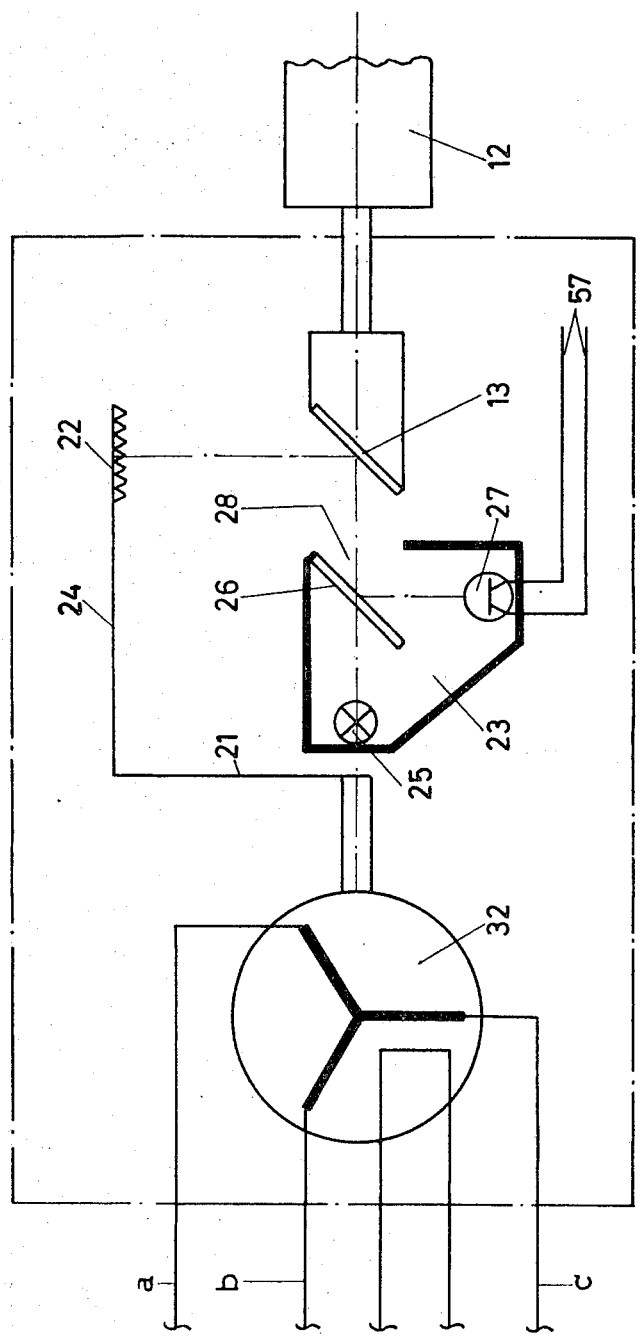
FIG. 2 is a more detailed diagram showing the synchronizing signal furnishing means of FIG. 1.

FIG. 2 is a more detailed diagram of the synchronizing signal furnishing means 2 of FIG. 1. A stator 32 is connected through remote control means 3 which, in the Figure, are shown as a synchro but which may also be a flexible mechanical shaft, to a further stator 31 which is part of indicator means 6. The lines for the stators of the electrical synchro are denoted by $a$, $b$ and $c$. Stator 32 is rotationally coupled to a carrier 21 which is mounted coaxially to shaft 12. Carrier 21 has an arm 24. A small sector of the inner surface of this arm carries a reflecting strip 22. Within the body of rotation described by arm 24 is mounted a stationary housing 23 which, in a preferred embodiment of the present invention is connected to the outer machine housing. A lamp 25 is arranged coaxially to shaft 12 and is energized either by an external source or by an internal power supply. The light from this lamp falls directly onto a partially transmissive mirror 26 which is mounted at an angle to the axis of the shaft. The light from the lamp also falls indirectly onto a photocell 27 which is mounted within housing 23 along the perpendicular to the shaft axis which is symmetrical thereto with respect to inclined mirror 26. Photocell 27 receives light from the side of mirror 26 which is away from lamp 25. The output of photocell 27 is connected via lines 57 to the indicator means 6. A mirror 13 is rigidly coupled for rotation with shaft 12 and at an angle to the shaft axis, the angle being so selected that light from lamp 25 which passes through partially transmissive mirror 26 is reflected by mirror 13 onto the body of rotation which is described by the reflecting strip 22 during a full rotation of carrier 21 about its axis. Housing 23 has a window 28 in the wall between lamp 25 and mirror 13. This window is the only place at which light can enter into the housing, the inner walls of the housing being made of light absorbent material. Thus photocell 27 is shielded from any unwanted interference light which may be present in the surroundings.

Indicator means 6 comprise a pulse amplifier 16 which, at a first input, receives pulses from contacts directly associated with the machine operation. Only one of these, contact 11, is shown in the figure. A second input of pulse amplifier 16 is connected via line 57 to receive the pulses from the synchronizing signal furnishing means 2. The pulses at the two inputs are amplified separately and appear at separate outputs. Thus whenever contact 2 is closed, a pulse appears at output 16a of pulse amplifier 16, while when contact 11 is closed an output pulse appears at the lower output of pulse amplifier 16, namely 16b. An AND-gate 17 and an OR-gate 18 are connected in parallel to lines 16a and 16b. Each pulse appearing at the output of OR-gate 18 is used to energize a lamp 20 which, in a preferred embodiment of the present invention, is a glow diode. This glow diode constitutes transducing means, since it converts the reference signals (signals produced by closing of contact 11) and the synchronizing signals (pulses produced by closing of contact 2) into first and second light beams respectively. The light from lamp 20 falls axially onto the end of a shaft which is rotationally coupled to shaft 12 either by means of a synchro or by means of a flexible mechanical shaft. The surface of the shaft on which the light falls is at an angle to the shaft axis. The light is reflected from this surface onto an optical indicator 61 at whose outer surface it is again reflected so that it falls onto a stationary projection disk 62. The stationary projection disk 62 is surrounded by additional disk means 63 which carry a scale. The additional disk means 63 are annularly mounted with respect to disk 62 and further are rotatable by hand. Any rotation of disk 63 is transmitted through a synchro system 3 having a stator 31 to the synchronizing signal furnishing means 2.

As shaft 12 rotates, the pulses coming from the machine 1 as well as the synchronizing signals coming from unit 2 are transmitted to OR-gate 18. Depending upon the difference in time between these pulses, two light spots appear on the projection disk 62 which have an angular displacement from each other which depends upon the difference in time at which the pulses were generated. Turning of disk 63 results in a corresponding turning of stator 32, thus causing the pulse generated by unit 2 to be angularly displaced relative to the pulse generated in machine 1. When both light spots coincide, coincidence between the two pulses has also been reached. A clear indication of this coincidence is further given by the lighting of indicator lamp 19 which is energized by the output of AND-gate 17.

Thus rotation of disk 63 allows very ready determination of the magnitude and direction of angular change required in synchronizing signal furnishing means 2 in order to bring same into coincidence with the signal furnished by contact 11. Coincidence between the two pulses is also readily determined, thus substantially decreasing the amount of time and further, resulting in a greater accuracy in determining coincidence between the two pulses.

While the invention has been illustrated and described as embodied in using specific embodiments for the various elements of the present invention, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. In equipment having a rotating shaft, synchronizing signal furnishing means for furnishing synchronizing signals under control of said shaft, and reference signal furnishing means directly coupled to said shaft for furnishing reference signals when said shaft is in a predetermined angular position, an arrangement for measuring the phase angle between said synchronizing signals and said reference signals, comprising, in combination, stationary projection disk means; transducing means for converting said reference signals and said synchronizing signals into, respectively, first and second light beams; and projection means rotating substantially in synchronism with said shaft, for projecting said first and second light beams onto said stationary projection disk means in such a manner that a first and second light spot is created on said projection disk means in response to said first and second light beams respectively, the angular distance between said first and second light spots constituting a measure of said phase angle.

2. The equipment as set forth in claim 1, further comprising manually rotatable additional disk means mounted annularly with respect to said stationary projection disk means; and first coupling means for coupling said additional disk means to said synchronizing signal furnishing means in such a manner that rotation of said additional disk means produced a corresponding rotation of said synchronizing signal furnishing means.

3. The equipment as set forth in claim 2, wherein said transducing means comprise a first light source, and means for energizing said first light source in response to said reference signals and said synchronizing signals, thereby producing said first and second light beams.

4. The equipment as set forth in claim 3, wherein said means for energizing said first light source comprise a source of electrical energy, and an OR-gate responsive to said reference signals and said synchronizing signals for connecting said source of electrical energy to said first light source.

5. The equipment as set forth in claim 4, further comprising an AND-gate connected in parallel with said OR-gate for furnishing an AND-gate output signal when said reference signals and said synchronizing signals are in time coincidence; and a second light source connected to said AND-gate for furnishing a visual indication of said time coincidence.

* * * * *